May 28, 1929.  N. H. KLAGES  1,714,959
PROCESS AND APPARATUS FOR BEVELING GLASS
Filed June 29, 1927  4 Sheets-Sheet 1
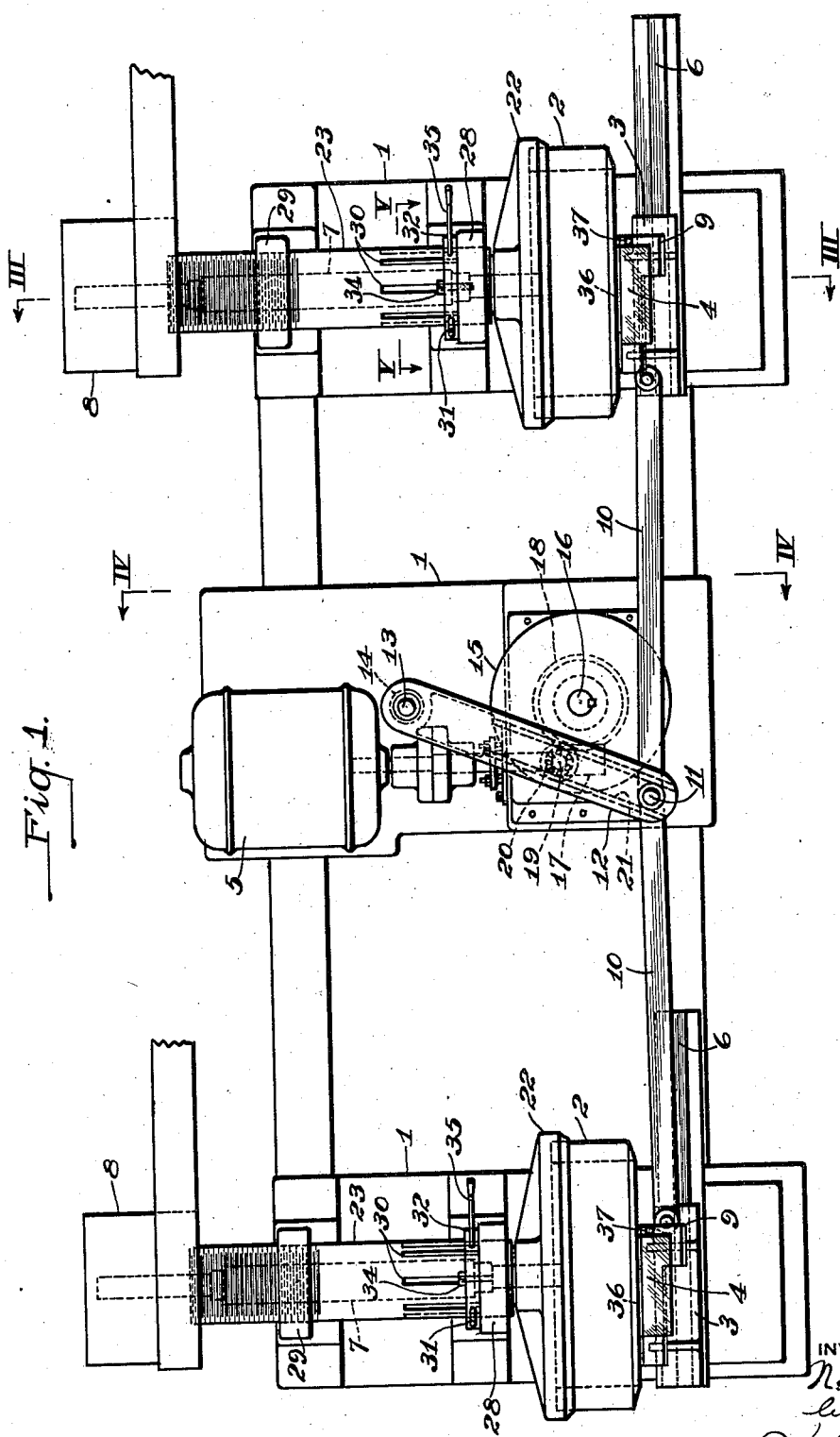

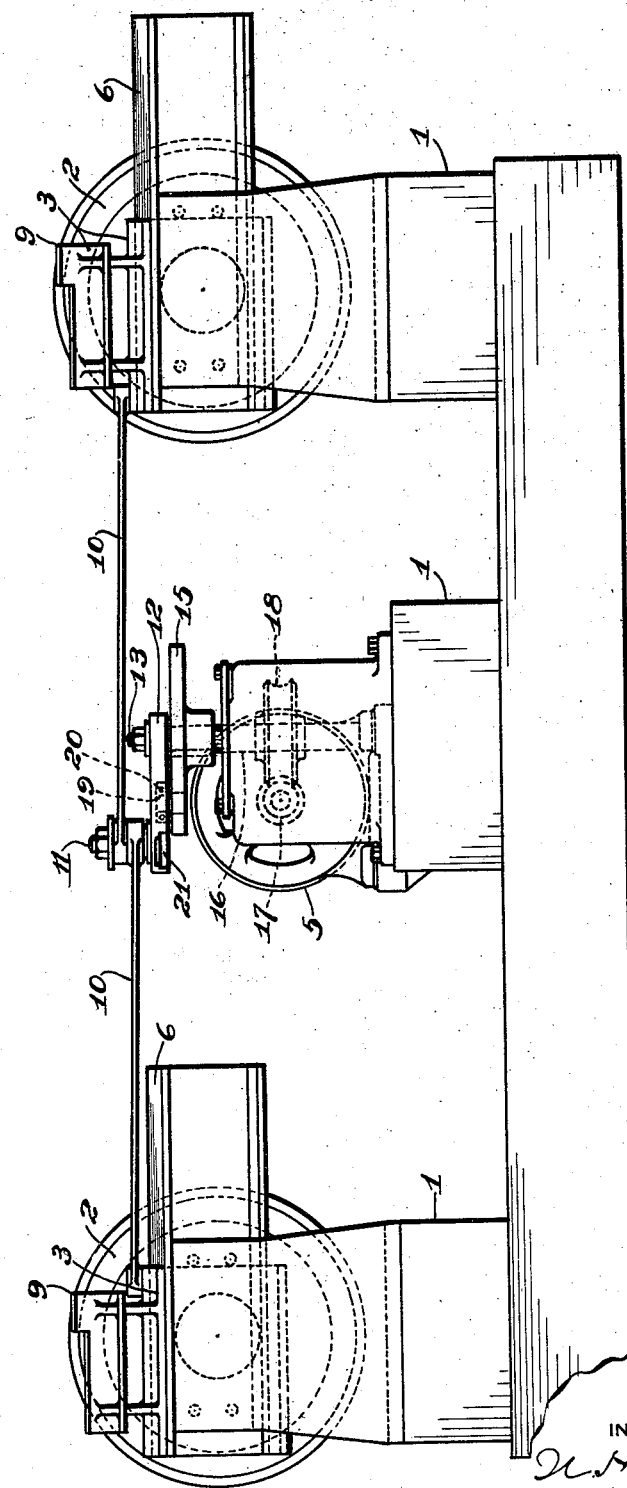

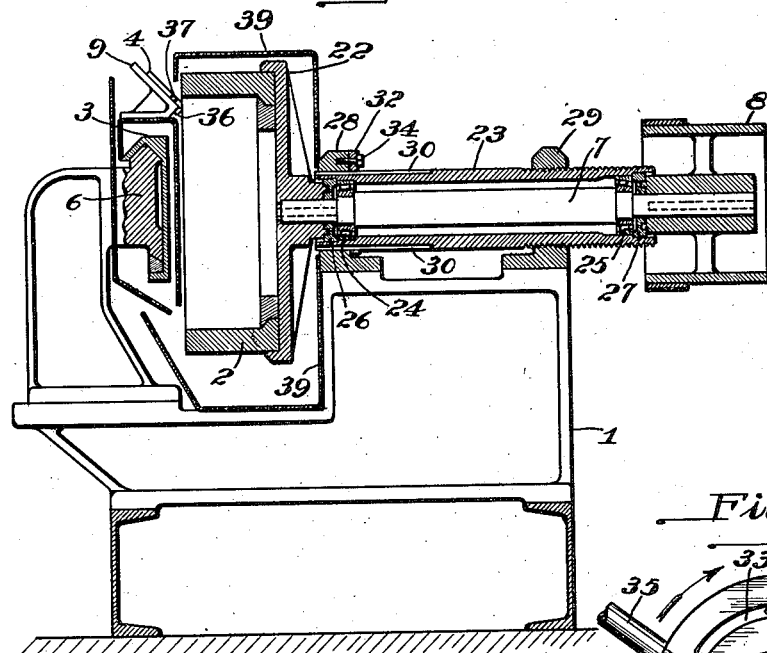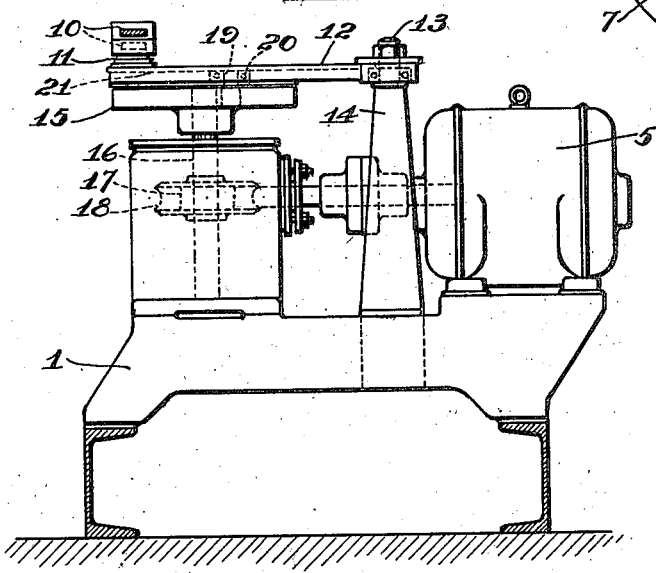

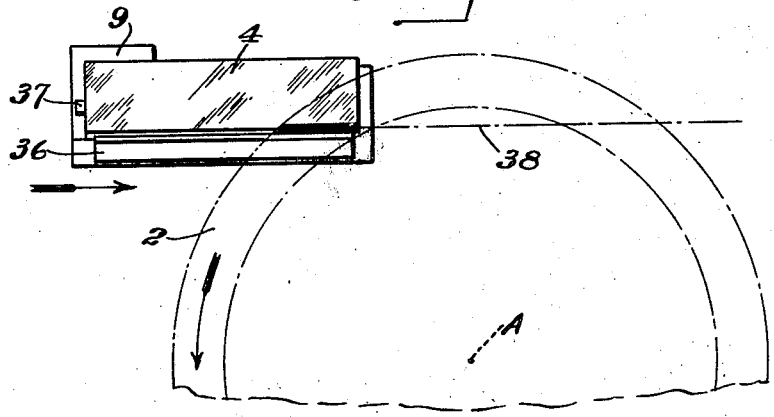
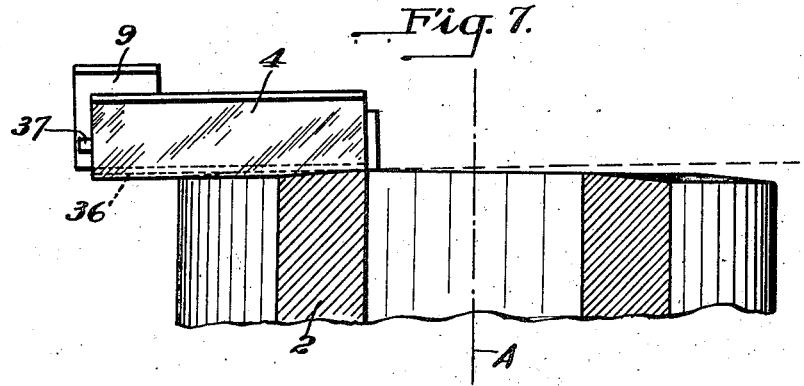
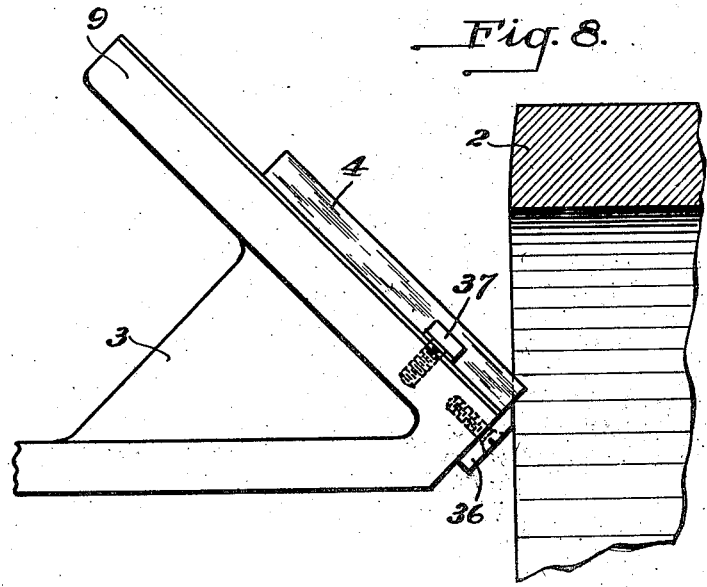

Patented May 28, 1929.

1,714,959

UNITED STATES PATENT OFFICE.

NORMAN H. KLAGES, OF PITTSBURGH, PENNSYLVANIA, ASSIGNOR TO G. W. KLAGES & SON, INC., A CORPORATION OF PENNSYLVANIA.

PROCESS AND APPARATUS FOR BEVELING GLASS.

Application filed June 29, 1927. Serial No. 202,190.

The invention relates to a process and apparatus for beveling glass, and particularly for beveling small size glass sheets for use in rear view mirrors for automobiles and the like. The invention has for its principal objects, the provision of a method and a machine or apparatus for carrying it out, whereby; (1) a very high production may be secured, and (2) whereby the glass may be beveled in a superior manner, without any chipping, and with smooth sharp edges at the intersection of the beveled surface with the other surfaces of the sheet. Briefly stated, these results are accomplished by the use of an annular grinding or beveling wheel, itself old in the art, arranged to cut diagonally across the edge of the glass sheet, while the glass is moved in a direction opposite to that of the wheel, where it engages the glass. This method of operation, in conjunction with the feature of holding rigidly in contact with the wheel (rather than yieldingly, as has heretofore been done) gives the results heretofore referred to, namely, sharp, smooth edges at the confines of the beveled surface, and an absence of chipping. A further result secured by this method is the uniform wear imposed on the wheel so that it grinds satisfactorily until the annular portion is used up. Other features contributing to the success of the operation are the holding of the sheet being beveled against vibration and chattering, this being done by the hands of the operator, and the provision of stop means arranged to oppose the movement of the sheets in the two directions in which the diagonal cutting action of the wheel tends to move them. In carrying out the operation, as above described, the glass is given a movement across the face of the annular wheel, and the axis of rotation of the grinding wheel is fixed, but it will be understood that the same result is accomplished, if the arrangement is reversed and the glass sheet is held in fixed position and the wheel moved along the glass, and that the invention comprehends both arrangements or methods of use. One form of apparatus for carrying out the process is shown in the accompanying drawings, wherein:

Figure 1 is a plan view. Fig. 2 is a front elevation. Fig. 3 is a section on the line III—III of Fig. 1. Fig. 4 is a section on the line IV—IV of Fig. 1. Fig. 5 is a section on the line V—V of Fig. 1. And Figs. 6, 7 and 8 are enlarged detail views of the grinding wheel and its relation to the work, Fig. 6 being a front elevation, Fig. 7 a plan view with the grinding wheel in horizontal section at the level of the cut, and Fig. 8 an end elevation, but with the grinding wheel in section.

Referring to the drawings, 1 is the framework of the machine, upon which are mounted the two annular grinding wheels 2, 2; the two reciprocating tables 3, 3 carrying the sheets of glass 4, 4; and the motor 5 for moving the tables back and forth on the guides 6, 6. The grinding wheels 2, 2 are carried by the spindles 7, 7, having at their ends, the pulleys 8, 8, and these pulleys are driven, by means of belts from a suitable source of power, not shown.

The tables 3, 3 have the plates 9, 9, which carry the sheets of glass, inclined at angles of about 45 degrees to the horizontal, as indicated in Fig. 3. The tables are mounted for reciprocation on the V-shaped guides 6, 6, as indicated in Fig. 3, and are moved back and forth by the connecting rods 10, 10, pivoted at their outer ends to the tables and at their inner ends to the vertical pin 11 carried by the end of the bar 12, the other end of such bar being pivoted at 13 to the end of the pillar 14 carried by the frame (Fig. 4). Located below the bar 12 is the disc wheel 15 mounted upon the vertical shaft 16, and this shaft is rotated from the motor 6 through the intermediary of the worm 17 on the motor shaft and the worm wheel 18 on the shaft 16. The disc wheel is provided with a crank pin 19 which carries a roller 20 mounted in the slot 21 on the lower side of the bar 12. The rotation of the disc wheel, therefore, moves the bar back and forth around the pivot 13, and causes the reciprocation of the rods 10, 10 and the carriages 3, 3 upon which the glass plates to be beveled are carried. By this means, the tables or carriages 3, 3 are carried back and forth across the faces of the two grinding wheels, the glass sheets being positioned on the back stroke of each carriage and then beveled on the forward stroke, one stroke, in each case serving to complete the bevel, as later more fully explained.

The spindle 7 of each wheel is mounted for longitudinal adjustment, as indicated in Fig. 3, to compensate for the wearing away of the face or edge of the wheel. The annular portion of the wheel is mounted upon a metal plate 22 having a hub which is keyed to one end of the spindle, the other end of the spindle being keyed to the drive pulley 8. The spindle rotates in the sleeve 23, such sleeve carrying the anti-friction bearings 24 and 25, clamped in position by the nuts 26 and 27. The sleeve is carried by the blocks or lugs 28 and 29, being slidable through the block 28 and threaded through the block 29. By rotating the sleeve, therefore, the spindle and grinding wheel may be adjusted forward from time to time to maintain the grinding face of the wheel in substantially the same position, this being continued until the wheel is substantially worn away. As later explained, the wearing away of the wheel, due to the process employed, is uniform and the angle of the face of the wheel remains constant after the operation is well under way, so that the grinding effect of the wheel remains substantially the same throughout its life. As indicated in Figs. 1 and 5, the sleeve is provided with a plurality of slots 30 at its forward end, which may be engaged by the spring pressed pin 31, so that the sleeve is held in any desired position of rotary adjustment. This pin is carried by the collar 32, secured to the block 28 by means of the bolt and slot connection 33, 34, a handle 35 being provided for turning the collar. This provides a means for rotating the sleeve 45 degrees from one position of adjustment to the next one, the bolt 34 serving to lock the parts in locked position.

The inclined plates or tables are each provided with a stop 36 along the lower edge and a stop 37 at one end (Figs. 6, 7 and 8) for positively holding the glass sheet 4 against movement while under the action of the grinding wheel and for positioning the sheet upon the plate. The operator holds the sheet tightly against these stops, thus eliminating vibration and avoiding breakage or chipping due to such cause. In operation, the plate or table carries the edge to be beveled laterally across the face of the grinding wheel at about the level indicated by the line 38 in Fig. 6, such line of movement being off center with respect to the axis of rotation A of the plate. With the plate 9 and its glass sheet moving in the direction of the arrow (Fig. 6), the wheel rotates counter clockwise, as indicated by the arrow. The cutting edge of the wheel thus gives the glass a diagonal shearing cut, and acts upon the glass tending to force it against the stops 36 and 37. This reduces the effort required by the operator to hold the sheet in position, and gives a much smoother, better cut, than if this condition did not obtain. This is particularly important as applied to the stop 36, as the contact of this stop in close proximity to the application of force to the glass by the wheel, gives support to the glass where most needed, thus reducing vibration and eliminating any chipping along the line defined by the upper edge of the stop. In operation, the wheel is set as indicated in Fig. 8, so that the entire corner of the sheet is beveled away at a single pass of the glass along the wheel. This feature not only multiplies the production of the machine as compared with all previous machines, with which I am familiar and which all operate to cut the bevel by the use of two or more passes over the wheel, but gives a better product free from chipping and with more sharply defined lines at the limits of the beveled surface. Another feature incident to the process, of even greater importance, is the mounting of the grinding wheel spindle and of the plate 9 upon its guides, so that these parts are relatively rigid, as compared to apparatus heretofore used, in which one of these parts is allowed to yield and move away from the other part slightly during the grinding operation, thus giving a yielding engagement between the glass and wheel. I have found that the unyielding engagement, due to the fact that the wheel and guides are rigid, as against movement away from each other, reduces breakage and chipping and causes the grinding wheel to wear uniformly, so that its face maintains itself at a proper and efficient grinding angle throughout the life of the wheel.

As indicated in Fig. 7, the axis of rotation A of the spindle is slightly inclined to the line of movement of the tables, or plate, so that the wheel cuts only upon one side, this being a feature of construction, which is important, but well known in the art. The grinding wheel is enclosed by a suitable casing 39 (Fig. 3) and water is supplied downwardly between the edge of the sheet 4 and the edge of the grinding wheel by any suitable means to facilitate the cutting action of the wheel as is common in the art.

What I claim is:

1. A process of beveling a glass sheet, which consists in causing a relative movement of the edge to be beveled in the direction of length thereof with respect to a relatively large annular grinding wheel having its axis inclined with respect to said direction of movement and having its face beveled back from its central portion towards its periphery, so that the wheel engages the glass on one side only of its center and cuts a bevel from one end of the sheet to the other, holding the sheet against vibration and also holding the wheel and sheet firmly against movement away from each other during said relative movement, and positively engaging the edge of the sheet next to the wheel with stop means along a part of the thickness of such edge, so as to position the sheet and hold it against movement towards the wheel, the movement of rotation of the cutting side of the wheel as it engages the glass edge having a component tending to move the sheet toward the stop means and also having a component tending to move the sheet in a direction opposite to said relative movement, and the entire bevel being cut at one pass.

2. A process of beveling a glass sheet, which consists in causing the edge to be beveled to travel longitudinally thereof across the face of a heavy annular grinding wheel having its axis inclined to the line of travel of the edge and having its face beveled back from its central portion to its periphery, the edge of the sheet being off center with respect to the center of rotation of the wheel, and engaging only one side of the wheel, holding the sheet against vibration and also holding the sheet and wheel firmly against oscillation or movement away from each other, positively engaging said edge with stop means along a part of its thickness so as to position it and hold it against movement toward the wheel, positively engaging another edge of the sheet lying at right angles to said first edge with stop means and cutting the entire bevel at one pass, the movement of the cutting side of the wheel as it engages the glass tending to move the glass against both of said stop means.

3. In combination in beveling apparatus, an annular grinding wheel element which is relatively large and heavy and has its face beveled back from its central portion toward its periphery, a sheet supporting plate element in front of the wheel and inclined at an angle thereto, a stop at the edge of the plate nearest the wheel projecting out past the face thereof a distance equal to a part only of the thickness of the sheet to be beveled, a second stop engaging one end of the sheet, one of said elements being mounted for movement in a direction lengthwise of said sheet, and said supporting element and wheel being firmly held against relative movement away from each other, and means for reciprocating said movable element, the relation of the cutting edge of the wheel to the two stops being such as to tend by its rotation to force the sheet against both of said stops, and the face of the wheel being inclined with respect to the edge of the sheet so that it engages the glass on one side only of its axis of rotation.

In testimony whereof, I have hereunto subscribed my name this 25th day of June, 1927.

NORMAN H. KLAGES.